United States Patent [19]

Krishnamurthy et al.

[11] Patent Number: 5,795,614
[45] Date of Patent: Aug. 18, 1998

[54] METHOD OF MAKING A REDUCED FAT EMULSIFIED DRESSING

[75] Inventors: Ramanathapur G. Krishnamurthy, Glenview; Vernon C. Witte, Naperville, both of Ill.

[73] Assignee: Kraft Foods, Inc., Northfield, Ill.

[21] Appl. No.: 609,453

[22] Filed: Mar. 1, 1996

[51] Int. Cl.$^6$ .................................................. A23L 1/24
[52] U.S. Cl. .................................... 426/613; 426/601
[58] Field of Search ..................................... 426/601, 613

[56] References Cited

U.S. PATENT DOCUMENTS

| | | | |
|---|---|---|---|
| 2,944,906 | 7/1960 | Spitzer et al. | 99/144 |
| 3,804,957 | 4/1974 | Purves | 426/363 |
| 3,955,010 | 5/1976 | Cozianin et al. | 426/605 |
| 4,283,432 | 8/1981 | Mitchell | 426/655 |
| 4,565,705 | 1/1986 | Snider | 426/640 |
| 4,758,515 | 7/1988 | Barwald | 426/658 |
| 4,871,574 | 10/1989 | Yamazaki | 426/804 |
| 4,923,707 | 5/1990 | Schoenberg | 426/602 |
| 5,169,671 | 12/1992 | Harada | 426/658 |
| 5,501,869 | 3/1996 | Buliga | 426/661 |
| 5,527,556 | 6/1996 | Freppiat | 426/658 |
| 5,585,480 | 12/1996 | Vogel | 426/658 |

FOREIGN PATENT DOCUMENTS

WO 93/0677  4/1993  WIPO.

*Primary Examiner*—Carolyn Paden
*Attorney, Agent, or Firm*—Fitch, Even, Tabin & Flannery

[57] ABSTRACT

The present invention is directed to a method for making oil-in-water food dressing emulsions which do not contain starch or gums. In accordance with the method, a premix which includes, a fat such as a vegetable oil, inulin an edible acid, egg yolk and water is provided. The premix is subjected to high shear emulsification by transporting the premix through an impact-type homogenizer operated at a pressure of at least 5,000 psig to provide an oil-in-water emulsion having suspended oil droplets in an inulin-egg yolk complex.

6 Claims, 1 Drawing Sheet

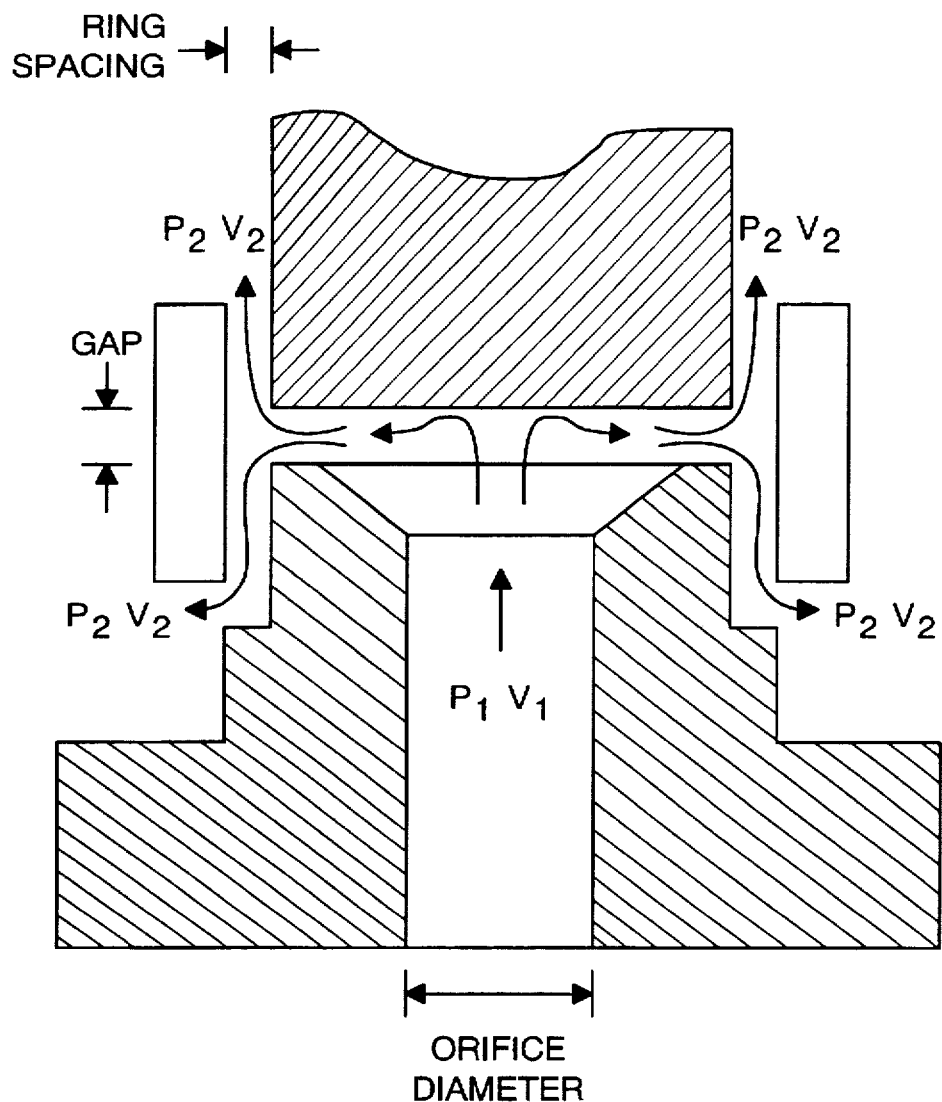

5,795,614

1

METHOD OF MAKING A REDUCED FAT EMULSIFIED DRESSING

FIELD OF THE INVENTION

The present invention relates generally to a method for the manufacture of viscous and pourable dressings having a reduced fat content. More particularly, the present invention is directed to an oil-in-water emulsion type dressings which are produced without the use of starch or gums.

BACKGROUND OF THE INVENTION

Mayonnaise is a well recognized oil-in-water emulsion. The manufacture of mayonnaise in the United States is controlled by the Food and Drug Administration (FDA) Standards of Identity. Mayonnaise is the emulsified semi-solid, non-pourable, oil-in-water emulsion prepared from vegetable oil, water, egg yolk-containing material and acidifying ingredient. A mayonnaise product made in accordance with the Standards of Identity cannot have less than 65% vegetable oil by weight. To be called a mayonnaise product in accordance with the FDA Standards of Identity, the emulsified dressing must be emulsified with egg yolk as the sole emulsifier and must contain at least 65% vegetable oil by weight.

In one method for the production of mayonnaise, the usual required ingredients are assembled and premixed in a container. The resulting premix is transferred to an emulsifying apparatus such as a colloid mill. The colloid mill provides relatively high shear forces which finely divide the premix and produce an oil-in-water emulsion to form which is highly viscous. High viscosity is a desirable quality because it produces a high level of stability.

In typical mayonnaise emulsions, the high viscosity is a result of tightly packing the globules of the dispersed phase, i.e., the oil globules, in the continuous water phase. This is relatively easy to accomplish when the percentage of oil is greater than 74%. This is why most commercial mayonnaise products typically have oil contents much higher than the legal minimum of 65%, i.e., an oil level greater than about 74%.

The difficulty of reducing the oil level below about 74% to produce a stable oil-in-water emulsion is illustrated by the teachings of U.S. Pat. No. 4,923,707 to Schoenberg. The Schoenberg patent describes a method for producing a mayonnaise wherein the oil content can be reduced to a level within the range of 65% to 72% through use of low DE corn syrup having a DE of from about 27 to about 43 in the mayonnaise formulation.

Many years ago, it was recognized that oil-in-water emulsions having an oil content less than 65% could be produced with great stability through use of a starch base. The term "salad dressing" refers to such starch-based salad dressings. Salad dressing, as generally defined the United States Federal Standards is the emulsified semi-solid, non-pourable oil-in-water emulsion prepared from an edible vegetable oil, an acidifying ingredient selected from vinegar, lemon juice or lime juice, an egg yolk-containing ingredient, and a cooked or partially cooked starch paste prepared from a food starch, tapioca flour, wheat flour, rye flour or combinations of these starchy materials and water. Salad dressing may also contain optional emulsifying ingredients in addition to egg yolk, such as gum acacia, carob bean gum, guar gum, gum karaya, gum tragacanth, carrageenan, pectin, propylene glycol, ester of alginic acid, sodium carboxymethyl cellulose or any mixture of two or more of these emulsifying ingredients.

2

Salad dressing, as defined by the Standards of Identity, contains not less than 30 percent by weight of vegetable oil and not less egg yolk-containing ingredient than is equivalent to egg yolk solids provided by liquid egg yolk at a level of 4 percent by weight.

PRIOR ART

Many efforts have been made to reduce the oil content of viscous dressings, such as mayonnaise and salad dressing to produce products similar to mayonnaise and salad dressing, but which have less oil than is permitted by the Standards of Identity of the FDA. Such reduced oil products would be considered to be reduced oil mayonnaise or reduced oil salad dressing.

U.S. Pat. No. 2,944,906 to Spitzer is directed to mayonnaise-like products with normal mayonnaise characteristics, but which contain a lower level of edible oils than are normally used in the manufacture of mayonnaise. In accordance with the Spitzer patent, low oil levels of from about 5 to about 30% by weight are provided in an oil-in-water emulsified dressing by use of a combination of gums. One of the gums being a stiff gum, such as agar-agar, and one of the gums being a soft gum, such as carboxymethyl cellulose. In accordance with the method of the Spitzer patent for preparing a mayonnaise-like dressing, the ingredients for the dressing are combined in a suitable mixer, such as a Groen kettle with auxiliary agitator removed. When agitation of the mixture of ingredients is stopped, a gel is formed on standing, which is pumped to a holding tank. The gel is then processed through a Manton-Gaulin homogenizer at 750–1000 psi to break down the gel to an oil-in-water emulsion.

U.S. Pat. No. 3,955,010 to Chozianin, et al. describes an emulsified oil dressing having a low level of acid and low pH. The Chozianin, et al. patent is particularly directed to providing low levels of acid and a bland flavor in salad dressing and french dressing type products. The emulsified oil dressings described in the Chozianin, et al. patent have an edible oil present in an amount of between 1% and 50%. Stability is provided to the emulsified oil dressings of the Chozianin, et al. patent through use of a starch base or an emulsifying agent, such as egg yolk solids and various gums. The Chozianin, et al. patent teaches the use of conventional homogenization equipment for production of the emulsified oil dressings. Such conventional homogenization equipment, at the time of filing the Chozianin, et al. patent application, was the use of a colloid mill or a Manton-Gaulin homogenizer.

One embodiment of the present invention is directed to producing mayonnaise-type, semi-solid dressings utilizing the ingredients commonly used in the preparation of mayonnaise, but which have greatly reduced oil levels in the range of from about 10% to about 40% and which do not contain starch or gums.

Another embodiment of the present invention is directed to producing pourable dressing type products which have greatly reduced oil levels compared to conventional pourable salad dressing of between about 10% and about 30% but which do not contain starch or gums.

DESCRIPTION OF THE DRAWINGS

FIG. 1 is a schematic drawing of a high pressure homogenizer that is useful in the present invention to provide stable oil-in-water emulsions.

SUMMARY OF THE INVENTION

The present invention is directed to a method for making oil-in-water food dressing emulsions which do not contain starch or gums. In accordance with the method, a premix which includes a fat, such as a vegetable oil, inulin, an edible acid, egg yolk and water is provided. The premix is subjected to high shear emulsification by transporting the premix through an impact-type homogenizer operated at a pressure of at least 5,000 psig to provide an oil-in-water emulsion having suspended oil droplets in an inulin-egg yolk complex.

DETAILED DESCRIPTION OF THE INVENTION

In general, the present invention is directed to viscous and pourable types of oil-in-water dressing compositions. The compositions include a fat selected from hard fats having a melting point of from about 80° F. to about 200° F. and vegetable oils which are liquid at ambient temperature, an egg yolk-containing material, an edible acid, inulin and water. The fat is present at a level of from about 10% to about 40%. The inulin is present at a level of from about 5% to about 30%. The egg yolk-containing product is present at a level sufficient to provide from about 1.5% to about 10% egg yolk solids. The edible acid, such as vinegar, is present at a level to provide a pH of from about 2.8 to about 4.5. Water is present in a quantity sufficient to provide the balance, i.e., generally at a level of from about 20% to about 80%.

The compositions may also contain sugar or artificial sweetener and flavoring materials, such as salt. The sweetener, if used, is present at a level equivalent to from about 0.5 to about 2.0 percent of sugar. The salt, if used, is present at a level of from about 0.5% to about 3.0%. The compositions may also contain antibacterial agents, such as potassium sorbate and surfactants such as Polysorbate 60.

The vegetable oil may be any of the well recognized food oils, such as soybean oil, corn oil, cottonseed oil, peanut oil and olive oil. The hard fat may be any food grade fat, such as butterfat, palm kernel oil and cocoa butter.

Inulin is a polysaccharide derived from various plant tubers, such as dahlia, jerusalem artichokes and chicory. Inulin is a polysaccharide of fructose units with a molecular weight of about 5,000. The molecular weight of inulin is dependent upon its source.

The edible acid can be any suitable edible acid, such as acetic acid and citric acid.

The egg yolks may be provided by any suitable source, such as whole egg, separated liquid egg yolk and dried egg yolk.

To prepare the dressing type products of the present invention, any dry ingredient, such as flavorings including salt and sugar are combined. About 70% of the water is added to a mixing container. The inulin and other dry ingredients are added and the mixture is stirred for about 2 minutes. The egg yolks are added and the remaining water is used to flush the remaining egg yolk material from the container. An edible acid is then added followed by the vegetable oil or hard fat. The entire formula is mixed for an additional period of from about 1 to about 4 minutes. If a hard fat is used, the mixture is heated to a temperature sufficient to melt the fat.

The mixture from the container is transferred by means of a suitable conduit and suitable pump through a high shear, high energy homogenizer operated at a pressure in the range of from about 5,000 psig to about 15,000 psig. A suitable high energy homogenizer is a Rannie homogenizer, such as that illustrated in FIG. 1.

The high-shear homogenizer, such as a Rannie homogenizer (APV Rannie, Copenhagen) has a knife edge homogenization element located within a closely surrounding impact ring. As shown in FIG. 1, the dressing formulation enters the homogenizer through an orifice 11 which is located in a valve seat 13. As the dressing formulation proceeds through the orifice 11, it impacts on the knife edge valve and seat 15. The knife edge valve and seat 15 causes an abrupt change in direction of flow of the dressing formulation causing it to impact onto the surface of the stream impact ring 17. The dressing formulation departs from the top and bottom of the stream impact ring at high velocities approaching the speed of sound. Generally, the initial pressure of the dressing formulation at the time of introduction into the orifice 11 is at least about 8,000 psig and preferably at least about 12,000 psig. The pressure P2 of the departing dressing formulation is substantially atmospheric.

As indicated, dressing formulations having a mayonnaise-like viscous or pourable quality can be produced by the method of the present invention having a fat level in the range of from about 10% to about 40% without the use of a starch paste. The level of use of the various components is manipulated within the indicated ranges to attain a viscous dressing or a pourable dressing.

The unique property of the present invention is the observed quick setting of the inulin and egg yolk mixture after passage through the homogenizer.

It is believed that the coprocessing of inulin and egg yolks within the indicated pH range causes an interaction between these two ingredients in an acid medium which gives the gel set. The quick setting gel mimics the structure and mouthfeel of reduced caloric mayonnaise without the addition of starches and gums, which are the current state of the art.

The following examples further illustrate various features of the invention but are intended to in no way limit the scope of the invention as set forth in the appended claims.

EXAMPLE 1

| Ingredient | Percent | Weight (g) |
|---|---|---|
| Water | 50.089 | 400.7 |
| Soybean Oil | 20.0 | 160.0 |
| Sugar | 1.0 | 8.0 |
| Inulin | 20.0 | 160.0 |
| Salted liquid egg yolks | 3.4 | 27.2 |
| 120 gr Vinegar | 3.0 | 24.0 |
| Salt | 2.0 | 16.0 |
| Potassium Sorbate | 0.175 | 1.4 |
| Mustard Flour | 0.136 | 1.09 |
| Polysorbate 60 | 0.2 | 1.6 |

Procedure—Mustard flour, potassium sorbate, salt and sugar were weighed together. Polysorbate 60 was weighed with the soybean oil. (The mixture was warmed slightly to solubilize the Polysorbate 60). Water, inulin and egg yolks were weighed separately.

About 70% of the water was added to a stainless steel Waring blender. The inulin and other dry ingredients were added and the mixture stirred for about 2 minutes. The egg yolks were added from a container and the remaining water used to flush the remaining egg yolks from the container. Vinegar was then added followed by the oil-polysorbate 60 mixture. The entire formula was mixed for an additional 2 minutes. Any foam that is produced was then removed. Foam causes pressure and processing problems in the Rannie homogenizer. A defoamer can be added as a processing aid.

The mixture was then processed in a lab scale Rannie homogenizer at 5,000 psi. Samples were collected and evaluated 15 hours later.

The product had a good texture, excellent cut and tasted smooth and creamy. There was no evidence of off flavors and the mouthfeel and aftertaste was good. TATX2 texture readings were 60.2 and 56.5. The titratable Acidity was 0.36; and the pH was 4.23.

EXAMPLE 2

A second formulation was prepared and processed in accordance with Example 1 except that the inulin level was reduced to 13% and the water level was increased to 56.82%. After processing in accordance with Example 1, a stable oil-in-water emulsion was obtained which was shelf-stable without phase separation.

What is claimed is:

1. A method for making emulsified oil-in-water food dressing formulations comprising providing a premix comprising a fat, from about 5% to about 30% inulin, egg yolk, an edible acid and water wherein the pH in said premix is from about 2.8 to about 4.5 and subjecting said premix to high shear emulsification by transporting said premix through a high shear emulsifier which has a knife edge homogenization element located within a closely surrounding impact ring and which is operated at a pressure of from about 5,000 psig to about 15,000 psig to provide a stable oil-in-water emulsion.

2. A method in accordance with claim 1 wherein said premix has from about 10% to about 40% by weight of said fat.

3. A method in accordance with claim 1 wherein said premix has from about 10% to about 40% by weight of said fat and from about 2% to about 10% of egg yolk solids.

4. A method in accordance with claim 1 wherein said premix has from about 10% to about 40% oil, egg yolk solids are present at a level of from about 2% to about 10% by weight, inulin is present at a level of from about 5% to about 30% and water is present at a level of from about 20% to about 80%.

5. A method in accordance with claim 1 wherein said fat is selected from the group consisting of from hard fats having a melting point of from about 80° F. to about 100° F. and vegetable oils which are liquid at ambient temperature.

6. A method in accordance with claim 1 wherein said premix further comprises a sweetener and salt.

* * * * *